Dec. 10, 1963　　　　M. PALMER　　　　3,114,095
STORAGE BATTERY CHARGING SYSTEM UTILIZING A
CONTROLLED RECTIFIER SWITCH RESPONSIVE
TO THE BATTERY-LOAD VOLTAGE
Filed Oct. 23, 1962
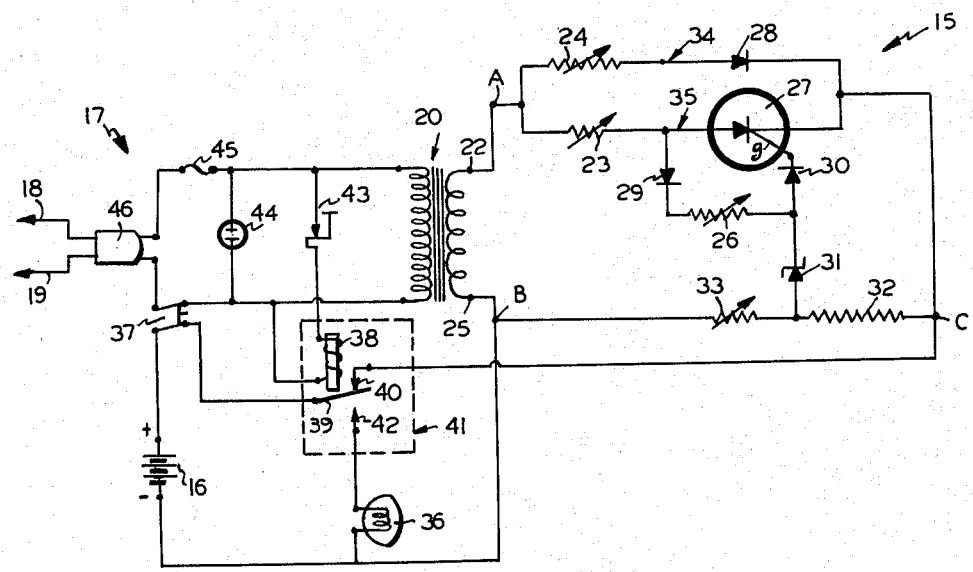
INVENTOR,
MAX PALMER,
BY
ATTORNEY.

United States Patent Office 3,114,095
Patented Dec. 10, 1963

3,114,095
STORAGE BATTERY CHARGING SYSTEM UTILIZING A CONTROLLED RECTIFIER SWITCH RESPONSIVE TO THE BATTERY-LOAD VOLTAGE
Max Palmer, 12 Midwood Road, Rockville Centre, N.Y.
Filed Oct. 23, 1962, Ser. No. 232,399
2 Claims. (Cl. 320—39)

The present invention relates to apparatus adaptable for charging an electric storage battery and is of the type using no electro-mechanical or relay devices to control the charging current so as to avoid make and break contacts in the battery charging means, but employs electronic means for automatically imposing a high charging current when the battery needs recharging and for automatically reducing the charging current when the battery has come to full strength.

Heretofore, it has been common experience with storage battery charging apparatus of all types, that quite often with lead batteries and too often with cadmium batteries, that there is a build up of voltage but not of current strength, so what is intended to be a fully charged battery, really has no working charge at all, although it registers the required voltage.

It is therefore the principal object of this invention to provide a novel and improved storage battery charging apparatus which functions properly by really charging the battery as it should be.

A further object of this invention is to provide a novel and improved storage battery charging apparatus of the character described, adapted for electrical systems in which the battery automatically operates electrical apparatus upon failure of a current supply operating other electrical apparatus, as for instance in a system in which the storage battery automatically operates an auxiliary lighting system when the current in the main lighting system fails; the storage battery being charged by the main current supply which is automatically made to maintain it at the proper charge. With this new apparatus using electronic means, the battery will be automatically recharged whenever it needs it, whenever the current in the main system is in operative condition in the circuit.

Another object thereof is to provide a novel and improved electronically-controlled battery charging apparatus of the kind set forth, which is compact, occasions no chatter in operation and practically needs no service once it has been adjusted and checked, and further it is one which is simple in construction, reasonably cheap to manufacture, reliable and efficient in operation.

Other objects and advantages will become apparent as this disclosure proceeds.

For one practice of this invention, the charging current is supplied from main A.C. lines and reduced to proper voltage which is introduced to a circuit which includes two branches in tandem. One branch includes a silicon controlled rectifier which permits a high current to serve to charge the battery and the other branch which includes a rectifier, allows a mere trickle charge to supply enough energy to keep the battery at full charge. The difference between the potentials at the battery and a Zener diode, controls the silicon controlled rectifier. When the battery reaches its charged state, the effect of the Zener is to cause the silicon controlled rectifier to stop conducting, and so automatically, the battery will receive only a trickle charge. If for any reason there is a drop in the battery charge, then the differences of potentials will make the Zener ineffective against the silicon controlled rectifier and the latter will immediately become conductive and supply high current to charge up the battery at a relatively rapid pace. There are no moving parts and the entire action is fully automatic.

The accompanying drawing which is part of this specification, shows a preferred circuit diagram of an electrical system including the teachings of this invention. It shows the new charging apparatus in conjunction with an emergency lighting system. The charging current is taken from the main power lines. The battery automatically operates the emergency lighting means upon the failure of the main power lines. Such power is on.

In the drawing, the numeral 15 designates generally a preferred form of charging apparatus for the storage battery 16 which is here shown as the power supply for an emergency lighting system indicated generally by the numeral 17. Where such battery-charging current supply is to be derived from the comparatively large voltage, alternating current, commercial power mains 18, 19, a step-down transformer 20 may be used.

In the circuit shown, one terminal of the secondary winding of the transformer, indicated at 22, is connected to one of the terminals of each of the resistances 23 and 24. The other terminal 25 of said secondary winding is connected to the negative terminal of the storage battery 16. The positive terminal of said battery is connected to the cathode terminals of the silicon controlled rectifier 27 and the rectifier 28. The anode terminal of the controlled rectifier 27 is connected to the other terminal of the resistance 23. The anode terminal of the rectifier 28 is connected to the other terminal of the resistance 24. Resistance 23 is of a comparatively low resistance, while the resistance of the resistance 24, is comparatively high. It is thus evident that the battery will receive a high charging current while the controlled rectifier 27 is conductive and that the battery will receive a mere trickle charge while the controlled rectifier is non-conductive.

The remainder of the circuit of the battery charging apparatus 15, is for the control of silicon controlled rectifier 27. So there is the rectifier 29 whose anode terminal is connected to the anode terminal of the silicon controlled rectifier 27 while its cathode terminal is connected to one terminal of a rather high value resistance indicated by the numeral 26. Another rectifier 30 has its cathode terminal connected to the gate terminal of said silicon controlled rectifier 27, while its anode terminal is connected to the other terminal of the resistance 26 and to the cathode terminal of a Zener diode 31. The anode terminal of said Zener is connected to one of the terminals of the relatively very high resistance 32 and the relatively low resistance 33. The other terminal of the resistance 32 is connected to the positive terminal of the storage battery 16 while the other terminal of the resistance 33 is connected to the negative terminal of said battery.

In operation, while the battery 16 is above a certain voltage, the Zener 31 is conductive and so effects the charge on the gate "g" that the silicon controlled rectifier 27 is non-conductive, hence the battery will receive a trickle charge through the branch 34. As soon as the voltage of the battery has fallen below said certain voltage, the effect of the Zener 31 on the silicon controlled rectifier 27 is nullified because said Zener fails to conduct, and said controlled rectifier 27 becomes conductive, hence the battery 16 will receive a high curent through the branch 35 and become charged, whereupon then, the trickle charge will again play.

In this manner, the battery 16 will always get charged when it needs it while there is current in the main lines 18, 19, which has been assumed for the above discussion in which the switch 37 is in closed condition and hence the relay's magnet coil 38 will attract its armature 39 thereby closing the battery circuit at contact point 40 to have it connected in the charging circuit 15. The battery 16 is thus constantly maintained in charged condition for operation of the emergency lighting system 17, or other electrical energy consuming device which may be in the place of the lamp 36, upon a failure of the power in said main lines 18, 19. Said emergency lighting system 17 is included herein merely to show an adaptation for this invention, where the storage battery 16, upon a failure in the main lines which operates a main lighting system not shown, operates the emergency lighting system. This invention is primarily concerned with the battery charging circuit and its various conditions while the current in the main lines 18, 19 is operative, and the transformer 20 actuated. The use to which the charged battery is put as here shown in conjunction with the auxiliary lighting system 17, is as mentioned, a mere example of adaptation.

For the emergency lighting system 17, there is the relay 41 comprising the magnet coil 38, its armature 39 and the contact points 40 and 42. Said coil in series with a normally closed push button switch 43, is connected across the main lines 18, 19. When the coil 38 is deactuated, as when there is a failure of current in the main lines, the armature 39 is in contact with the contact point 42 thereby closing the circuit of the emergency lamp 36 which is across the battery 16 in such instance. While power is available at the main lines 18, 19, said coil 38 is energized, and the armature 39 is in contact with the contact point 40 as shown.

The battery 16, the charging apparatus 15 and the relay 41 may be compact within a portable casing (not shown), having accessible the operating element of the push-button switch 43 to test whether the battery is working, the double-pole, single throw switch 37 as well as the viewable pilot lamp 44 which is to show if the main lines 18, 19 are active. A fuse 45 may be interposed in a main power line and connection to a power outlet may be afforded by a male plug 46. The lamp 36 may be mounted on such casing. It is evident that upon a failure in the main power lines 18, 19, the magnet coil 38 of the relay will become deactuated, whereupon the armature 39 which is spring-biased, will bear against the contact point 42 and thus cause the lamp 36 to be operated by the storage battery. Of course, this will cause the battery 16 to discharge, but it will become recharged automatically when the power in the main lines 18, 19 is restored. When the switch 37 is open, there is no power to charge the battery.

It may be mentioned that any or all of the resistances may be variable and such is preferred for all except 32, for the making of factory adjustments.

As a matter of example of values for a practical storage battery charging system, the transformer 20 is for an input of 115 volts, 60 cycles, yielding an output of 15 volts, 5 amperes, and as indicated below for the various components, namely:

Silicon controlled rectifier 27—5 amp., 200 PIV;
Rectifiers 28, 29, 30—400 ma., 200 PIV;
Resistance 23—1.2 ohms, 25 watt;
Resistance 24—33 ohms, 2 watt;
Resistance 32—39K ohms, ½ watt;
Resistance 26—110 ohms, ½ watt;
Resistance 33—18 ohms, ½ watt;
Zener diode 31—250 mw.

From the wiring diagram, it is evident that the reduced A.C. is applied to the battery-charging system, at what may be called the main input terminals which are marked A and B, and that the battery 16 is connected across B and C which may be called the main output terminals of the circuit. The term "main terminal" is chosen merely to facilitate identification, because the word "terminal" is used in other instances. To further aid identification of the various components recited in the appended claims, I have chosen to call the rectifiers 28, 29 and 30, the first, second and third rectifiers respectively, and to call the resistances 24, 23, 26, 33 and 32, the first, second, third, fourth and fifth resistances respectively.

This invention is capable of numerous forms and various applications without departing from the essential features herein disclosed. It is therefore intended and desired that the embodiment shown herein shall be deemed illustrative and not restrictive, and that the patent shall cover all patentable novelty herein set forth; reference being had to the following claims rather than to the specific description herein to indicate the scope of this invention.

I claim:

1. In a system for charging a storage battery from an A.C. source, a controlled electronic rectifier of the type having an anode and cathode and also a gate electrode, which latter when subjected to a predetermined electrical charge, makes said rectifier conductive so that current is allowed to flow from the anode to the cathode, first, second and third main terminals; said first and second main terminals being the input terminals for connection across a suitable source of A.C., and said second and third main terminals being the output terminals for connection to the terminals of a storage battery to be charged, first, second and third rectifiers of the type having an anode and a cathode, a Zener diode having an anode and a cathode, first, second, third, fourth and fifth resistances; the first and fifth resistances being of relatively high resistance value; the anode of the first rectifier being connected to a terminal of the first resistance; the anode of the controlled rectifier being connected to the anode of the second rectifier and to a terminal of the second resistance; the other terminals of said first and second resistances being connected to said first main terminal; the cathodes of said controlled rectifier and the first rectifier and a terminal of the fifth resistance, being connected to the third main terminal; one of the terminals of the third resistance being connected to the cathode of the second rectifier; the other terminal of the third resistance being connected to the anode of the third rectifier and to the cathode of the Zener diode; the cathode of the third rectifier being connected to the gate of the controlled rectifier; the anode of the Zener diode being connected to the other terminal of the fifth resistance and to a terminal of the fourth resistance; the other terminal of the fourth resistance being connected to the second main terminal; said Zener diode being adapted to be actuated by the potential existing at the main output terminals when said potential is above a predetermined value, to be conductive so that current is allowed flow from its anode to its cathode and thus bias the gate to hold the controlled rectifier non-conductive whereupon the first resistance will allow a trickle current to be available at the main output terminals; said Zener diode being non-conductive when said potential is below said predetermined value, thus allowing excitation of said gate, whereupon the controlled rectifier becomes conductive and will allow a substantially large current from the current source, to be available at the main output terminals.

2. A system as defined in claim 1, wherein predetermined resistances are variable.

No references cited.